United States Patent
Sanghavi et al.

(10) Patent No.: US 8,924,516 B2
(45) Date of Patent: Dec. 30, 2014

(54) DYNAMIC CONSTRUCTION OF MODULAR INVITATIONAL CONTENT

(75) Inventors: Mehul K. Sanghavi, Sunnyvale, CA (US); Michael Froimowitz Greenzeiger, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 13/457,097

(22) Filed: Apr. 26, 2012

(65) Prior Publication Data

US 2013/0179434 A1 Jul. 11, 2013

Related U.S. Application Data

(63) Continuation-in-part of application No. 13/345,486, filed on Jan. 6, 2012.

(51) Int. Cl.
*G06F 15/16* (2006.01)
*G06Q 30/00* (2012.01)

(52) U.S. Cl.
USPC ........................................ 709/219; 705/14.54

(58) Field of Classification Search
USPC ............................. 705/14; 709/219; 707/513
See application file for complete search history.

(56) References Cited

U.S. PATENT DOCUMENTS

| | | | |
|---|---|---|---|
| 4,602,279 A * | 7/1986 | Freeman | 725/35 |
| 5,724,521 A * | 3/1998 | Dedrick | 705/26.1 |
| 6,247,048 B1 | 6/2001 | Greer et al. | |
| 6,442,529 B1 | 8/2002 | Krishan et al. | |
| 6,502,076 B1 * | 12/2002 | Smith | 705/14.54 |
| 6,904,408 B1 | 6/2005 | McCarthy et al. | |
| 7,818,419 B1 | 10/2010 | McAllister et al. | |
| 8,108,895 B2 * | 1/2012 | Anderson et al. | 725/36 |
| 8,131,256 B2 | 3/2012 | Martti et al. | |
| 8,135,860 B1 | 3/2012 | Brown et al. | |
| 8,468,227 B2 | 6/2013 | Vasudevan et al. | |
| 2001/0042081 A1 * | 11/2001 | MacFarlane et al. | 707/513 |
| 2002/0092019 A1 * | 7/2002 | Marcus | 725/37 |
| 2003/0005437 A1 * | 1/2003 | Feuer et al. | 725/34 |
| 2003/0005465 A1 * | 1/2003 | Connelly | 725/119 |
| 2003/0023490 A1 * | 1/2003 | Lenyon et al. | 705/14 |
| 2003/0101454 A1 * | 5/2003 | Ozer et al. | 725/42 |
| 2003/0115318 A1 * | 6/2003 | Wueste | 709/224 |
| 2003/0182567 A1 * | 9/2003 | Barton et al. | 713/193 |
| 2004/0003398 A1 * | 1/2004 | Donian et al. | 725/34 |
| 2004/0015986 A1 * | 1/2004 | Carver et al. | 725/36 |
| 2005/0267798 A1 * | 12/2005 | Panara | 705/14 |
| 2006/0212353 A1 | 9/2006 | Roslov et al. | |
| 2007/0220010 A1 | 9/2007 | Ertugrul | |

(Continued)

*Primary Examiner* — Brian P Whipple
*Assistant Examiner* — Michael A Chambers
(74) *Attorney, Agent, or Firm* — Novak Druce Connolly Bove + Quigg LLP

(57) ABSTRACT

The present disclosure is related to managing delivery of items of invitational content based on a feature-based model. Specifically, a content delivery system is provided for managing a campaign using a content bundle identifying different content blocks and rules for assembling the content blocks into the items of invitational content. The feature-based model then accrues costs based on content blocks delivered, content blocks accessed, a degree of user interaction with the accessed content blocks, or any combinations thereof. The relative performance of the items can be evaluated by obtaining a ranking based at least on the number of content blocks and a performance of these content blocks. The ranking can then be used to manage future assembly and delivery of items. In some configurations, rules can be provided to specify when particular content items can be included as costs vary.

26 Claims, 7 Drawing Sheets

(56) References Cited

U.S. PATENT DOCUMENTS

| | | |
|---|---|---|
| 2008/0215428 A1* | 9/2008 | Ramer et al. .................... 705/14 |
| 2009/0144141 A1* | 6/2009 | Dominowska et al. ......... 705/14 |
| 2009/0199107 A1 | 8/2009 | Lewis et al. |
| 2010/0138451 A1 | 6/2010 | Henkin et al. |
| 2011/0106622 A1 | 5/2011 | Kuhlman et al. |
| 2011/0112906 A1 | 5/2011 | Pulijala et al. |
| 2012/0030023 A1 | 2/2012 | Roslov et al. |

* cited by examiner

DYNAMIC CONSTRUCTION OF MODULAR INVITATIONAL CONTENT

This application is a continuation-in-part of U.S. patent application Ser. No. 13/345,486, filed on Jan. 6, 2012, entitled, DYNAMIC CONSTRUCTION OF MODULAR INVITATIONAL CONTENT, which is hereby incorporated by reference herein in its entirety.

TECHNICAL FIELD

The present disclosure relates to invitational content and more specifically to construction of invitational content.

INTRODUCTION

When designing a rich media advertisement it is necessary to include a combination of content relevant to the consumer and an interface suited to enabling efficient user navigation. As used herein, the term "rich media advertisement" refers to advertising content configured to allow some level of interaction between the user and the advertisement. However, not all consumers have the same device capabilities, are interested in the same type of content, or prefer to navigate advertisements using the same interface. Accordingly, rich media advertisement developers typically select the content and user interface elements that are suitable for the majority of users. However, this does not guarantee a successful campaign. For example, some users may still prefer primarily to watch videos about products or services advertised while others may prefer to read through product specifications, play games involving the product or brand, or share the content with their friends through social media. Additionally, some users may respond better to a linear advertising experience whereas other may prefer to choose their own path through advertising content; some may prefer to have an entirely passive experience more similar to television advertising.

Additionally, creating a rich media advertisement is frequently a labor-intensive process adding to the costs for the advertiser in developing and modifying the advertisements. Therefore, although it may be desirable to create multiple versions of the advertisement to appeal to a variety of classes of users, it is not necessarily cost-effective or feasible in terms of manpower. Over the course of an advertisement campaign, it often becomes necessary to make changes in advertisement units if they do not perform according to the goals of the advertiser, if those goals change over time, or if new advertising content becomes available. However, because of the initial costs and other inherent limitations, the costs, time, and complexity required for making effective changes are generally too high for many advertisers. Accordingly, the present invention addresses these issues.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims.

Disclosed are devices, systems, methods, and non-transitory computer-readable storage media for the management of modular invitational content from invitational content providers. Invitational content can often times be delivered by a content delivery system configured to retrieve and manage the content from the invitational content providers and other content providers. The present technology provides a content bundle identifying content blocks and rules for assembling the content blocks into items of invitational content can be provided. In addition to delivering the invitational content, the present technology can allow the invitational content to vary and evolve over time in response to users by allowing the modifying of the content bundle according to user responses to the invitational content being generated.

The present technology also provides a feature-based model for pricing and managing a campaign using a content bundle identifying content blocks providing different features and rules for assembling the content blocks into the items of invitational content. The feature-based model is configured for accruing costs based on content blocks delivered, content blocks accessed, a degree of user interaction with the accessed content blocks, or any combinations thereof. For managing using a feature-based pricing model, the relative performance of the items can be evaluated by obtaining a relative ranking based at least on the number of content blocks and a performance of these content blocks. The ranking can then be used to manage future assembly and delivery of items for the campaign. The management techniques of the present technology also provide for processing of the content blocks in order to determine whether or not particular content items can be included based on fluctuations in cost. These adjustments can be based on pre-defined criteria or conditions and can include replacement or removal of content blocks from an item of invitational content prior to delivery.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
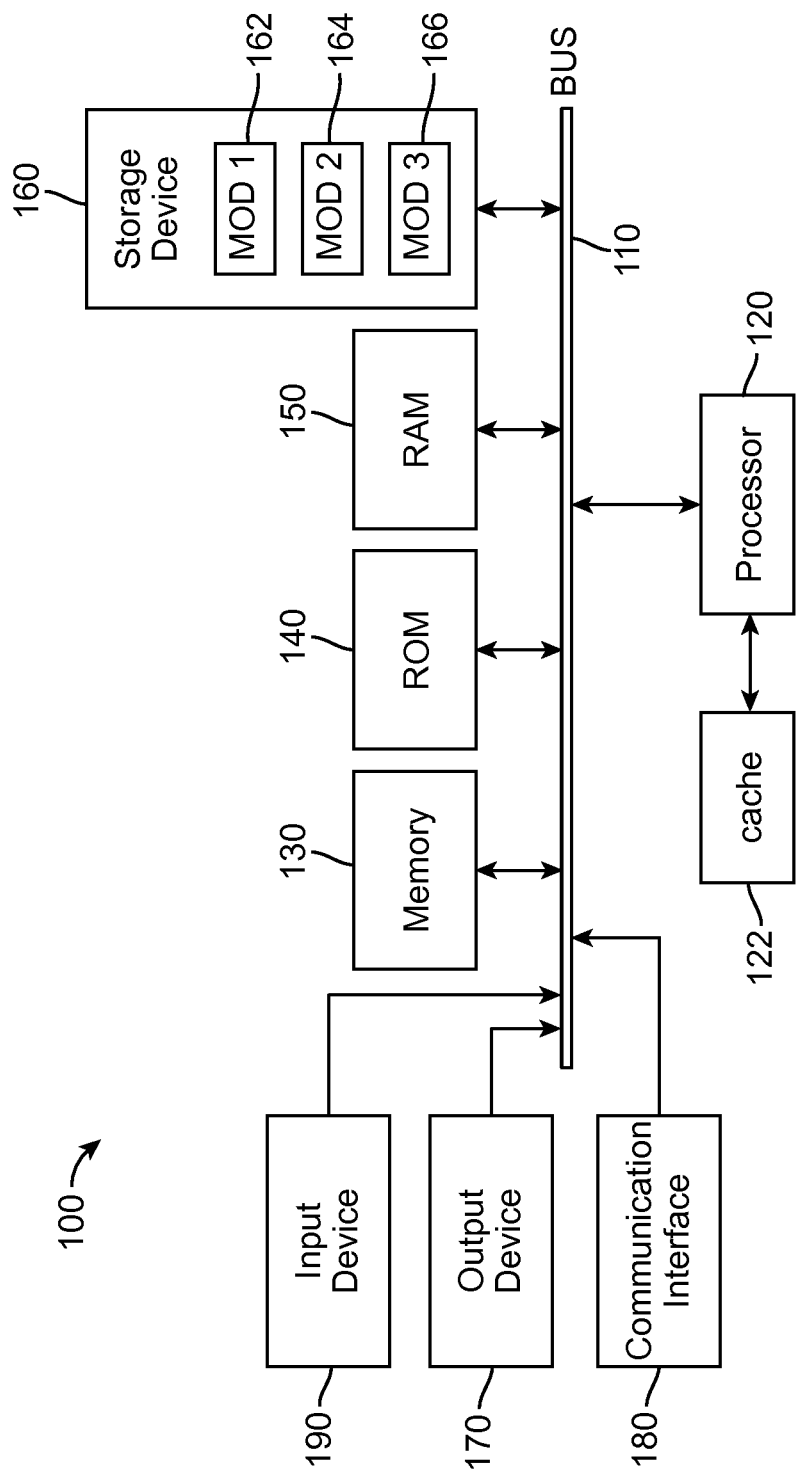
FIG. 1 illustrates an example system embodiment.

FIG. 1 illustrates an exemplary system 100 that includes a general-purpose computing device 100, including a processing unit (CPU or processor) 120 and a system bus 110 that couples various system components including the system memory 130, such as read only memory (ROM) 140, and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs a hard disk as storage device 160, it should be appreciated by those skilled in the art that other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166, which are modules configured to control the processor 120. These modules may be stored on the storage device 160 and loaded into RAM 150 or memory 130 at runtime or may be stored as would be known in the art in other computer-readable memory locations.

Figure 2:
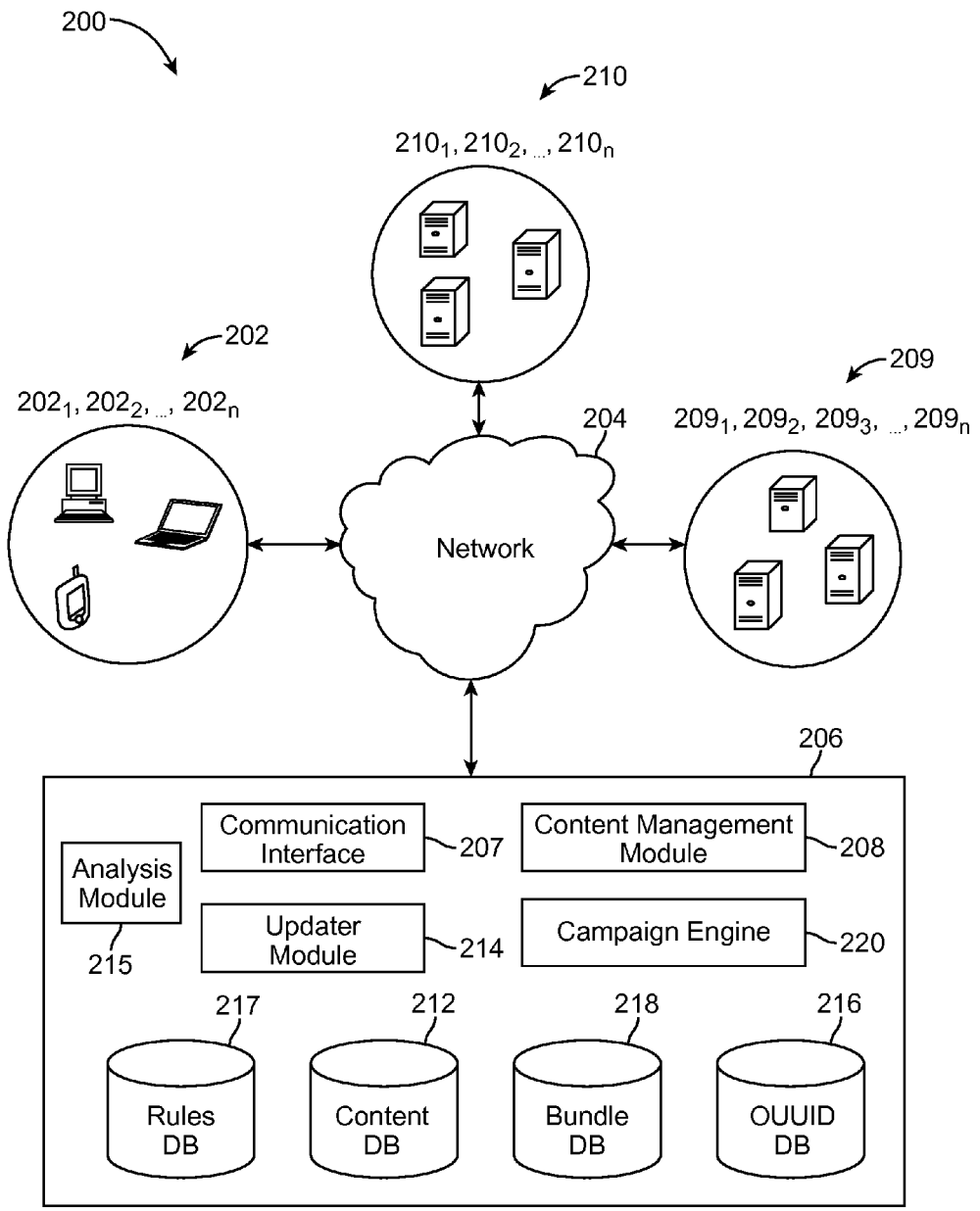
FIG. 2 illustrates an exemplary system configuration wherein electronic devices communicate via a network for purposes of exchanging content and other data.

Having disclosed some components of a computing system, the disclosure now turns to FIG. 2, which illustrates an exemplary system configuration 200, wherein electronic devices communicate via a network for purposes of exchanging content and other data. The system can be configured for use on a network as that illustrated in FIG. 2. However, the present principles are applicable to a wide variety of network configurations that facilitate the intercommunication of electronic devices. For example, each of the components of system 200 in FIG. 2 can be implemented in a localized or distributed fashion in a network.

In system 200, invitational content is delivered to user terminals $202_1 \ldots 202_n$ (collectively "202") connected to a network 204 by direct and/or indirect communications with a content delivery system 206. In particular, the content delivery system 206 receives a request for a content package of electronic-invitational content, such as a web page, an application, a game, or media, etc., from one of user terminals 202. In the various embodiments, one or more types of invitational content can be combined in a content package. The user terminal 202 can be configured to render the received invitational content. This can include display or playing the invitational content appropriately depending on the form of the invitational content. For example, the invitational content can include text, graphics, audio, video, executable code or any combination thereof. Upon successfully rendering the delivered invitational content, the user terminal 202 can be configured to send a notification to the content delivery system 206. In some embodiments the notification can be a web beacon such as an embedded tracking pixel. In some embodiments, the invitational content can be associated with a product or can directly or indirectly advertise a product. In some embodiments, the content package can be configured to replace or update invitational content in a content package already delivered to the user terminal 202.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, the content delivery system 206 selects the invitational content in response to the request and transmits the assembled invitational content to the requesting one of user terminals 202. In some embodiments, the server has preselected the invitational content before the request is received. Thereafter, the server assembles a content package of invitational content and causes the content package to be delivered to the user. The content delivery system can include a communications interface 207 to facilitate communications with the user terminals 202 and any other components familiar to those of ordinary skill in the art.

The content delivery system 206 includes a content management module 208 that facilitates generation of the assembled content package, which can include invitational content. Specifically, the content management module 208 can combine content from one or more primary content providers $209_1 \ldots 209_n$ (collectively "209") and content from one or more invitational content providers $210_1 \ldots 210_n$ (collectively "210") to generate the assembled content package for the user terminals 202. For example, in the case of a web page being delivered to a requesting one of user terminals 202, the content management module 208 can assemble a content package by requesting the data for the web page from one of the primary content providers 209 maintaining the web page. For the invitational content on the web page provided by the invitational content providers 210, the content management module 208 can request the appropriate data according to the arrangement between the primary and invitational content providers 209 and 210. In some embodiments, device 202 can directly request or already have access to primary content from primary content provider 209. In such embodiments, device 202 can further request invitational content from system 206. System 206 can identify and deliver invitational content appropriate for association with primary content. For example, primary content such as an application can already reside or be running of a device 202, and primary content can direct device 202 to request invitational content from system 206 to be associated with primary content on device 202.

As described above, content maintained by the content providers 209 and 210 can be combined according to a pre-defined arrangement, which can be embodied as a set of rules. In an arrangement where the content delivery system assembles the content package from multiple content providers, these rules can be stored in a rules database 217 in content delivery system 206 and content management module 208 can be configured to assemble the content package for user terminals 202 based on these rules. The rules can specify how to select content from secondary content providers 210 and the primary content providers 209 in response to a request from one of user terminals 202. For example, in the case of a web page maintained by one of primary providers 209 and including variable advertisement portions, the rules database 217 can specify rules for selecting one of the secondary providers 210. The rules can also specify how to select specific content from the selected one of secondary providers 210 to be combined with the content provided by one of primary providers 209. Once assembled, the assembled content package can be sent to a requesting one of user terminals 202. However, the content package is not limited to the content from content providers 209 and 210. Rather, the content package can include other data generated at the content delivery system 206.

Although primary and invitational content providers 209 and 210 are presented herein as separate entities, this is for illustrative purposes only. In some cases, the primary and invitational content providers 209 and 210 can be the same entity. Thus, a single entity can define and provide both the primary and the invitational content.

Although the content management module 208 can be configured to request that content be sent directly from content providers 209 and 210, a cached arrangement can also be used to improve performance of the content delivery system 206 and improve overall user experience. That is, the content delivery system 206 can include a content database 212 for locally storing/caching content maintained by content providers 209 and 210. The data in the content database 212 can be refreshed or updated on a regular basis to ensure that the content in the database 212 is up-to-date at the time of a request from a user terminal. However, in some cases, the content management module 208 can be configured to retrieve content directly from content providers 209 and 210 if the metadata associated with the data in content database 212 appears to be outdated or corrupted.

In the various embodiments, the content delivery system 206 can also include an obfuscated unique user identifier(s) (OUUID) database 216 that can be used for managing sessions with the various user terminal devices 202. The OUUID database 216 can be used with a variety of session management techniques. For example, the content delivery system 206 can implement an HTTP cookie or any other conventional session management method (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of handheld communications devices, such as mobile phones, smart phones, tablets, or other types of user terminals connecting using multiple or non-persistent network sessions, multiple requests for content from such devices may be assigned to a same entry in the OUUID database 216. The delivery system 206 can analyze the attributes of requesting devices to determine whether such requests can be attributed to the same user. Such attributes can include device or group-specific attributes.

In some embodiments, the content delivery system 206 can also include a campaign engine 220 which can be configured to fulfill campaigns for content providers 210 by managing inventory and pricing of invitational content delivered to user terminals 202. In the various embodiments, the campaign engine 220 engages in an inventory atom-based booking and atom-based pricing system. That is, the space for invitational content provided by primary content providers 210 is managed as an inventory or collection of atoms defining an inventory space or region in a k-dimensional space of atoms, where each of the k dimensions is associated with one of a plurality of traffic segment characteristics. In the various embodiments, the k dimensions can include both orthogonal and non-orthogonal dimensions. That is, some of the k dimensions can overlap or can be related in some aspect. For example, if separate dimensions are specified for city and state, these dimensions are non-orthogonal.

In the various embodiments, each atom represents a portion of traffic associated with a specific set of values for the traffic segment characteristics in the k-dimensional space. For example, an atom can represent a fixed number of impressions for a particular segment. The inventory space will consist of one or more portions of the k-dimensional space depending on the segment characteristics associated with the content space available from the primary content providers 209. Accordingly the content delivery system 206 can manage an electronic campaign for one or more secondary content provider 210 based on the one or more segment characteristics of interest to each of the secondary content providers 210. In the various embodiments, the segment characteristics can include demographic characteristics, channel characteristics, spatial-temporal characteristics, behavioral characteristics, and demographic characteristics, to name a few. Channel characteristics can define the specific delivery channel being used to deliver a content package. For example, channel characteristics can include a type of electronic content, a type of device or user terminal, a carrier or network provider, or any other characteristic that defines a specific delivery channel for the content. Spatial-temporal characteristics can define a location, a date, a time, or any other characteristic that defines a geographic location and/or a time for delivery of the content. Demographic characteristics can define characteristics of the users targeted by the content or associated with the content. For example, demographic characteristics can include age, income, and ethnicity, but can also include other demographic characteristics such as gender, occupation, or any other user characteristics. Behavioral characteristics can define user behaviors for one or more different types of content, separately or in combination with any other contextual characteristics. That is, different behavioral characteristics may be associated with different channel, demographic, or spatial temporal characteristics. For example, users may be associated with higher conversion or response rates for some types of delivery channels.

Content providers 210 can arrange to have their invitational content delivered by the content delivery system 206 to user devices not only based on meeting targeting criteria, but also based on a pricing scheme. Further, the pricing scheme can be based on eliciting a specified user response. For example, in some embodiments the pricing scheme can be arranged so that a content provider 210 is charged a set price for eliciting a user response of viewing the invitation content. A user viewing the invitational content can be measured as an invitational content impression. An impression can be counted as every time an item of invitational content is displayed at the user terminal 202 for at least a predetermined amount of time. For example, if the invitational content is a banner advertisement, an impression can be counted if the banner advertisement is displayed on a user terminal 202 for 3 seconds. In some embodiments the predetermined time can vary according to the invitational content. For example, the invitational content can be a video and so an impression can be counted upon completion of the video.

In some embodiments, the pricing scheme can be based on eliciting a user response to invitational content. For example, a campaign can charge for each conversion associated with delivered invitational content. A conversion can be counted in many ways, for example, in some embodiments a conversion can be counted when a user clicks on a banner advertisement and is forwarded to additional content. In some embodiments a conversion can be counted when a user purchases a product advertised by the invitational content. Although impression and conversion are used as examples, any pricing scheme or combination of can be used.

A content provider 210 can arrange a campaign in any number of ways. In some embodiments, a content provider 210 can choose a maximum cost limit for a period of time. For example a campaign can be configured so that the cost of delivering the invitational content does not exceed $10,000 over a month. In some embodiments the campaign can be configured to have a price limit over a time interval as well as another limit for a smaller time period. For example, a campaign can be allocated $10,000 over a month, but not to exceed $500 in any given day. Campaigns can also be configured to have a minimum amount to be spent per a certain time period. For example, a campaign can have a daily max of $1,000 per day as well as a minimum of $950 per day. These examples are not meant to be limiting, campaigns can be configured in any number of ways known in the art.

The campaign engine 220 can be arranged to manage the delivery of the invitational content based on the parameters of the campaign. For example, if a content provider 210 has arranged a maximum limit of $1,000 per day, the campaign engine 220 can monitor the number of impressions and conversions, and upon the limit being reached, no longer deliver the item of invitational content. Ensuring that the maximum limit is not exceeded can be important because in some embodiments the content provider 210 is not liable to pay more than the maximum limit per day and so any impression or conversion above the limit would be free of charge to the content provider 210.

In addition to the above-mentioned components, the content delivery system 206 can further include an analysis module 215 for evaluating the performance of a campaign. The analysis can be performed in various ways and can provide various types of results. For example, the analysis module 215 can generate metrics for the campaign, provide a comparison of the campaign to specific criteria, generate values indicating that one or more conditions or criterion have been met, or any combinations thereof. These exemplary analysis methods are provided solely for illustrative purposes and any other methods can be used without limitation. The results of the analysis can be communicated to an invitational content provider associated with a campaign, components within content delivery system 206, or any combination thereof.

The analysis module 215 can collect the data for evaluating a campaign from various sources. For example, the content delivery system 206 can be configured to maintain, as part of analysis module 215 or elsewhere, a journal of user responses to particular content blocks. The data for the diary can be obtained from various sources. For example, the content delivery system 206 can directly monitor responses to the invitational content it generates and update the diary accordingly. In another example, the content delivery system 206 can query the invitational content provider (such as content provider 210) to obtain information regarding responses to the invitational content and update the diary accordingly. In still another example, a user terminal 202 could be configured to archive responses locally and provide the results to the content delivery system 206 at a later time. Thereafter, the content delivery system 206 can update the diary accordingly.

As described above, one aspect of the present technology is the gathering and use of data available from various sources to improve the delivery of advertisements or any other content that may be of interest to users. The present disclosure contemplates that in some instances, this gathered data may include personal information data that uniquely identifies or can be used to contact or locate a specific person. Such personal information data can include demographic data, location-based data, telephone numbers, email addresses, social media IDs such as TWITTER IDs, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given advertisement or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

As noted above, one cornerstone of a successful campaign is providing invitational content that elicits a preferred response from the targeted segment. However, the constraint that many invitational content providers typically face is that their ability to provide adjustment during campaign is generally limited. In particular, adjustment of targeted segments is generally not available. For example, invitational content providers may be contractually bound to the originally selected targeted segments. In such cases it may be possible to retool the invitational content for the campaign, but the cost of the development of additional invitational content can be prohibitive. As a result, many campaigns, although being properly managed by campaign engine 220, may be performing at sub-optimal level in conventional content delivery systems since the invitational content is not specifically tuned to the elicit a preferred response from the targeted segment. In the present technology, the content delivery system 206 can be configured to address the limitations of creating and managing campaigns.

A first aspect of the present technology is to structure invitational content using a modular approach. That is, rather than requiring that the invitational content provider provide the invitational content as a complete, single unit substantially ready to be delivered, the invitational content can instead be defined as a collection of content blocks that can be assembled by the content delivery system 206 to form the invitational content.

In the various embodiments, the content blocks can include fixed content blocks and variable content blocks. The fixed content blocks can be used to define the general framework or structure for an item of invitational content. The variable content blocks can define the specific content that can be included in the framework. Additionally, the variable content blocks can be configured to allow them to be combined with more than one fixed content block. Thus, the variable content portions can be configured to be interchangeable with respect to each other and with respect to one or more fixed content blocks.

For example, in one configuration, the fixed content blocks for forming items of invitational content can be embodied as a series of templates for rich media advertisements that contain the basic structures possible for various types of advertisements. Such a template could define, for example, if and when videos are to be played, what form a menu of the rich media advertisement could take, and what types of user interactions are possible for navigating through the rich media advertisement. Thus, to form such rich media advertisements, an advertiser could choose the template they prefer for their advertising content and then select which elements (i.e., variable content blocks) would be combined with the template. Such a configuration allows the advertiser to define a specific configuration for their electronic advertisement. However, the interchangeability of the fixed and variable content blocks allows the template to be selected by the content delivery system 206 as part of the optimization process on the level of individual users or classes of users. For example, by selecting different templates (i.e., fixed content blocks) for the different users or classes of users.

A second aspect of the present technology is to provide a new methodology for controlling individual campaigns in view of the modularization of the invitational content. That is, a methodology for managing the use of content blocks. In particular, in the various embodiments provide for controlling individual campaigns by specifying a content bundle associated with the campaign. In the various embodiments, a content bundle is a collection of various types of bundle data that can be useful for assembling invitational content and that can be updated at any time by the invitational content provider, the content delivery system 206, or both. At a minimum, the bundle data can identify fixed and variable content blocks for the campaign and a set of assembly rules. The assembly rules for the campaign can specify how to combine the fixed and variable content blocks to form items of invitational content for the campaign, as described above. The assembly rules can be configured to be dependent on the user terminal 202 to which the invitational content is to be delivered. For example, the assembly rules can specify particular ones of the fixed and variable content blocks for user terminal 202 based on one or more properties of the user terminal 202, one or more preferences or characteristics of the user associated with the user terminal 202, properties or characteristics of the network 204, and any combination thereof. The listed properties and characteristics are provided solely for illustrative purposes and any other properties or characteristics can be used without limitation to determine a combination of content blocks for an item of invitational content.

In the various embodiments, the properties or characteristics used by the assembly rules for the content bundle can be stored at a variety of locations. For example, in some cases, the content delivery system can maintain a database of such preferences for various users, devices, obfuscated unique user identifier(s), networks, etc. . . . In another example, such a database can be maintained by any of providers 209 and 210. In either case, the assembly process can include accessing such databases to obtain appropriate information. In yet another example, such data can be requested from the requesting user terminal 202. In still another example, a variety of methods can be utilized to determine or at least estimate the characteristics or properties for the user terminal 202 requesting content. Any other methods of obtaining and storing such information can also be used, without limitation, in the various embodiments.

In operation, the content management module 208 can still access the rules database 217 to determine how to assemble invitational content to be delivered to the user terminal 202. In one configuration, the entry assembling invitational content for the campaign in rules database 217 can simply provide a pointer to the corresponding content bundle in bundle database 218. Thus, the content management module 208 accesses the content bundle in the bundle database 218 and assembles the item of invitational content accordingly. Accordingly, to update the invitational content for the campaign, the existing content bundle is simply replaced or updated in the bundle database 218. In another configuration, the data for the content bundle can be directly stored in rules database 217. In such a configuration, the bundle database 218 can be used to store a content bundle consisting of a set of pointers to the data in rules database 217. Accordingly, to update the invitational content for the campaign, the content bundle can be used to facilitate access to the corresponding portions of the rules database 217 to update the appropriate entries therein.

As described above, the content bundle is modifiable by various entities. However, in some embodiments, as described in greater detail below, automatic or semi-automatic updating of the content bundle can be performed by an updater module 214 in the content delivery system 206. In such embodiments, the content bundle can provide a set of modification rules so that when specific conditions are met, the rules trigger specific changes in the content bundle. Specifically, the analysis module 215 can forward its analysis to updater module 214. Thereafter, the updater module 214, based on the modification rules and the analysis can determine if and how the content bundle can be modified. For example, if the analysis of the campaign indicates that certain content blocks tend to elicit preferred responses from certain types of users, the modification rules can provide for adjusting the assembly rules in the content bundle so that those content blocks are always presented to such types of users in order to elicit a greater number of preferred responses. Similarly, if the analysis of the campaign providers indicates that certain content blocks do not tend to elicit preferred responses from certain types of users, the modification rules can provide for adjusting the assembly rules in the content bundle so that those content blocks are not presented to such types of users in order to elicit a greater number of preferred responses.

The present technology therefore provides a simplified design and updating process for electronic advertisements and other invitational content. For example, even though not all consumers have the same device capabilities, are interested in the same type of content, or prefer to navigate advertisements using the same interface, it is not necessary to make the typical compromise of selecting the content and user interface elements that are suitable for the majority of users. Instead, the present technology allows advertisement experience to be customized for each user at each interface. That is, over the life of the campaign, it is possible to give users the content and interface they prefer which would potentially lead to greater user engagement and deliver a superior value to the advertiser in terms of user engagement and advertising results. Some exemplary methodologies for managing such content bundles are generally described with respect to FIGS. 3, 4, 5, 6, and 7.

Figure 3:
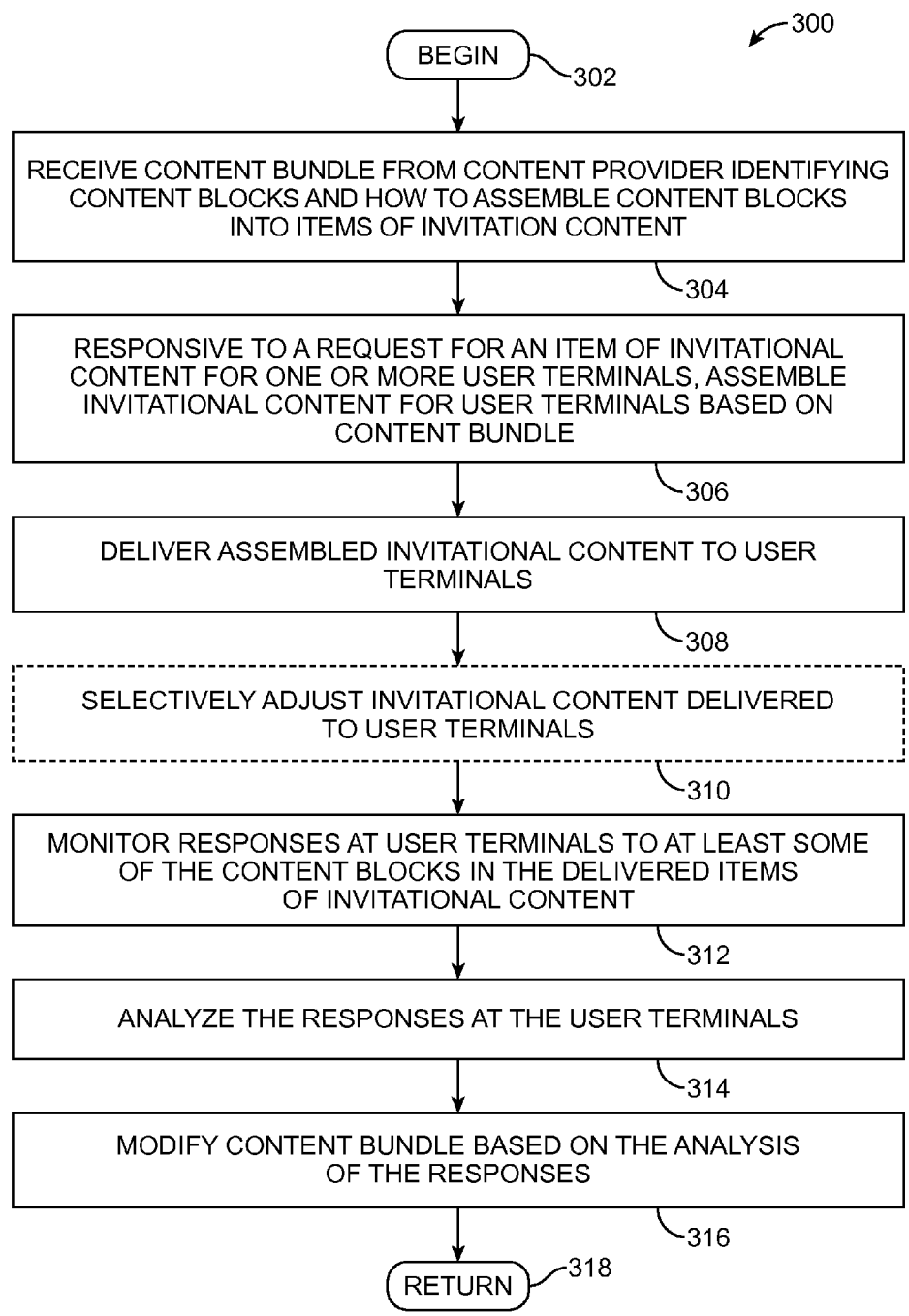
FIG. 3 illustrates an exemplary method embodiment for providing dynamic construction of modular invitational content.

FIG. 3 illustrates an exemplary method embodiment 300 for providing dynamic construction of modular invitational content. Method 300 begins at block 302 and continues on to block 304. At block 304, a content bundle is received at the content delivery system 206 from an invitational content provider associated with a campaign. As previously described, the content bundle can identify the content blocks for assembling invitational content for the campaign and rules for assembly thereof. The content bundle can be integrated into the content delivery system 206 as previously described.

Once the campaign is established and the initial content bundle is received at block 304, the method 300 proceeds to block 306. At block 306, responsive to receiving a request to deliver invitational content to a user terminal 202, the appropriate invitational content is assembled. In particular, once the campaign engine 220 and the content management module 208 determine which campaign invitational content is to be generated for the user terminal 202, the corresponding content bundle is used to determine the content blocks available for the invitational content and the assembly rules are used to assemble the invitational content for the request. Block 306 also includes obtaining data regarding any properties or characteristics associated with the assembly rules, as previously discussed. Further, block 306 can also encompass storing such data for future reference. Once the invitational content is assembled at block 306, the response to the request is delivered at block 308, including delivery of the assembled invitation content.

In some configurations, the content delivery system 206 can selectively adjust the content delivered to the user terminals at block 310. For example, the content bundle can specify a particular combination of content blocks for a user terminal of a specific type and associated with a category of user. However, the user terminals may be operating on a network with limited bandwidth or that does not support transmission of certain ones of the selected content blocks. In such cases, the content delivery system 206 can intercept the invitational content prior to delivery and adjust in accordance with other conditions or criteria not specified in the content bundle. For example, in the example above, the content delivery system 206 can automatically downgrade the certain ones of the content blocks to other content blocks with lower bandwidth requirements. Any other conditions and criteria, as well as rules, can be specified at the content delivery system 206 to support this adjustment.

After the invitational content is received at the user terminal 202, the response to the invitational content can be monitored at block 312. For example, as described above, a journal can be provided in analysis module 215 to make note of the responses. Thereafter, at block 314, the responses at the user terminal can be analyzed by analysis module 215, as previously described. In the various embodiments, the responses can be monitored and analyzed in various ways. That is, in addition to the methods already described above, the responses can also be analyzed in a segmented or divided manner. For example, the responses can be analyzed with respect to the portal on which the invitational content appears. In another example, in a configuration where the content delivery system is embodied as a plurality of content delivery systems working cooperatively or independently, the responses can be analyzed with respect to each of the content delivery systems. However, these are but a few exemplary methods of segmenting or dividing the analysis. In the various embodiments, the monitoring and the analysis can be performed with respect to any segments or divisions of interest without limitation. Further, these segment or divisions can be specified by the invitational content provider, the content delivery system, or both.

Following the analysis of the responses at block 314, the content bundle can be modified or updated by the updater module 214 based on the analysis at block 316. As noted above, the modifying of the content bundle can be performed manually or automatically to adjust the content blocks available and the assembly rules for the content blocks. These processes are described below in greater detail with respect to FIGS. 4 and 5. After the content bundle is modified or updated, the method 300 proceeds to block 318 and resumes previous processing, including repeating method 300.

As noted above, a significant result of method 300 is that different users can receive invitational content that consists of different combinations of content blocks. The present technology contemplates that the content delivery system, via the campaign manager 220 or other elements, can adjusts costs incurred based on the content blocks being delivered. That is, alternatively or in combination with impression-based (e.g., cost per 1,000 or CPM), conversion-based (e.g., cost per click or CPC), or any other pricing schemes, a cost per feature (CPF) scheme can be utilized in the various embodiments.

CPF addresses, at least in part, the limitations of CPC and CPM models. In particular, such models have not kept pace with the advances in the creation and rendering of invitational content, such as Rich Media Advertisements (RMAs). RMAs, specifically those used for mobile device advertising, typically have a unique blend of form factors, environmental constraints and device specific features and functions, (e.g., gyro meters, accelerometers, compass, vibrate functions) which cannot be replicated in display advertising on other computing device such as a personal computer.

However, the one size fits all approach for CPM, CPC, and other conventional pricing models does not generally blend well with ever increasing cost of generating content for such campaigns while still serving to an increasingly fragmented user audience associated with different device models, demographics, and interests. Accordingly, to more efficiently handle the delivery of invitational content to these different devices, a new pricing model can be provided which adapts to sets of particular features and function of interest in a campaign to the invitational content provided.

In one configuration, this can simply be a pricing model based on the particular content blocks being delivered to the user terminal 202. That is, costs are accrued based on which content blocks are being delivered, similar to a CPM scheme. Thus, as items of invitational content are assembled and delivered, the content blocks being delivered in these items are logged or monitored. Thereafter, a cost for the delivery of the content bundle can be determined and billed to the invitational content provider.

Alternatively, the cost can be based on the content blocks actually utilized by a user at the user terminal 202. For example, if the invitational content includes a content block defining a video, a cost would apply only if the user views the video. That is, costs are accrued based on which content blocks are being accessed after delivery of the content bundle, similar to a CPC scheme. Thus, some means is required in order to determine which content blocks are being accessed, as the user action may not result in a signal being sent back to the content delivery system 206. Accordingly, this can require providing communications links between the content delivery system 206 and the content provider 209, 210, or any third party systems, in order to determine which particular content blocks are subsequently accessed at a user terminal, a cost for the item of invitational content can be determined.

Further, the degree of interaction might also define the costs. That is, CPF-based campaign can specify the amount or extent of interaction required between a content block and the user before a cost is accrued. For example, a campaign can require that a user view a video in its entirety or to at least a certain point. Thus, if the user fails to reach the desired point in video, either no cost or a different cost may apply. A similar pricing scheme can be provided for any type of content block. That is, a minimum amount or type of interaction can be required prior to accruing a cost. The degree of interaction required with a content block can be pre-defined before the start of the campaign. Further, the degree of interaction can vary depending on the invitational content provider. For example, two providers can have different specifications around degrees of interaction. As a result, the start (or entry) and the end (or exit) with respect to a same set of content blocks can be different. Accordingly, any subsequent analysis of the performance of the content blocks within the content bundle will require the consideration of the different degrees of interaction required by the providers.

In still another example, such as in the case of adjusting content blocks (i.e., dynamic invitational content), as described above with respect to block 310 in FIG. 3, the cost can be based on what is finally delivered or utilized at the user terminal 202. For example, if a video needs to be upgraded or downgraded due to bandwidth limitations, the final cost is for the final version and not the initially delivered version. A similar pricing scheme can be provided for any type of content block. A similar pricing scheme can be provided for any type of content block.

Additionally, any combination of the above and any other scheme based on pricing based on delivered content blocks, user interaction with the content blocks, or any combination thereof can be used in the various embodiments without limitation.

A CPF arrangement can allow the invitational content provider to obtain not only more knowledge of how the campaign is operating, but also provides an ability to customize precisely what invitational content experiences the invitational content provider wishes to purchase. For example, an invitational content provider can purchase or target specific numbers of video views, app downloads, and other experiences. Further, with the knowledge of the particular experiences the invitational content provider wishes to purchase, the campaign manager 220 can more intelligently select which invitational content and which campaigns to select invitational content from during operation of the content delivery system 206.

Additionally, the content bundle can also be used to adjust such targets. For example, for the number of impressions or conversions purchased by the invitational content provider, the content bundle can be used to dynamically adjust the experience for each of these. Further, in some instances, such adjustments can be utilized by campaign manager 220 to contain costs for the invitational content provider. For example, if the campaign manager needs to provide invitational content, but the desired experience is not available due to user, user terminal, network, or other conditions, the campaign manager can provide invitational content at a discount or even free of charge. Thus, most, if not all, of the budget for the campaign is reserved for the desired experiences.

The CPF model provides benefits to both the content delivery system and the invitational content provider. With respect to the invitational content provider, once the campaign is tuned with the correct content blocks, there is almost a guaranteed usage of features provided and thus a good return on investment for the invitational content provider. That is, the invitational content providers can select content blocks for the content bundle specifically designed for the users being served and for the types of interactions typically associated with such users. As a result, the likelihood that users receiving the content bundle will provide the targeted interaction with the content blocks being delivered is extremely high. With respect to the content delivery system, since the content bundles are assembled and delivered as noted above and there is a "guaranteed" usage of features, a majority of the delivered content bundles should accrue a maximum amount of cost and thus revenue for the content delivery system.

As noted above, a tuning of the CPF-based campaign would be required to provide the above-mentioned "guaranteed" usage of features. In a CPM or CPC-based campaign, the analysis to tune the campaign is relatively trivial as it merely requires a ranking of the items of invitational content based on item-specific criteria. That is, CPM based campaigns can be evaluated based on effective CPM (eCPM) and CPC based campaigns can be ranked based on conversion performance, However, in the case of a CPF-based campaign, a different type of ranking system is generally required in order to evaluate their performance and determine the proper assembly of a content bundle for a particular segment of users. In particular, the ranking of campaigns or items needs to take into account the individual features included and the features' performance. Thus, eCPM or conversion performance would be insufficient for evaluating CPF-based campaigns and instead requires a new type of computed score.

In particular, it will be required to compute a weighted score which will take into account the varying features of items of invitation content available via the content bundle. This weighted score needs to account for the fact that features will not have the same cost (for example, the cost of videos, downloads, ringtones, and tweets will vary) and will also not the same effectiveness. For example, consider that if CPF-based performance is based usage of the features. Next consider two types of items of invitational content. The first type of items have smaller sets of content blocks and overall do well CPF-wise (i.e., a majority of the content blocks are being accessed). The second type of items have a larger set of content blocks and over do not do well CPF-wise (i.e., a majority of the content blocks are not being accessed by user). The ranking would need to result in the types of items being ranked higher than the second types of items, since the first types of items are essentially getting a relatively greater number of responses using a fewer number of features.

Figure 4:
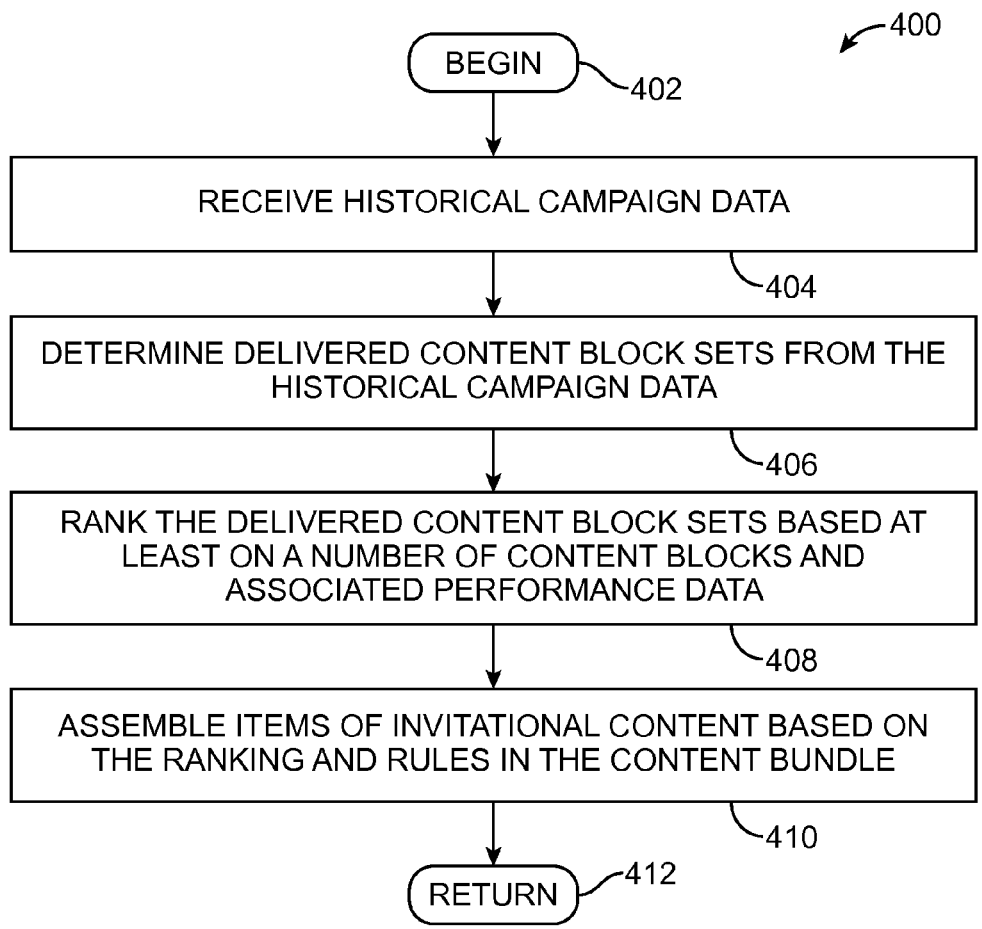
FIG. 4 is a flowchart of steps in an exemplary method 400 for managing delivery of invitational content based on ranking of content block sets.

In view of the foregoing, a CPF-wise ranking in accordance with the present technology could proceed as outlined in FIG. 4. FIG. 4 is a flowchart of steps in an exemplary method 400 for managing delivery of invitational content based on ranking of content block sets. The method 400 begins at step 402 and proceed to step 404.

At step 404, historical campaign data is received. At step 404, a component of the content delivery system 206, such as an analysis module 215, can be configured to receive campaign data from various sources. That is, the campaign data can be compiled from data stored by the content delivery system 206, providers 209 and 210, or even user terminals 202.

This campaign data can include, for example, information identifying delivered items of invitational content, including the content blocks used for these delivered items and the segments for which the delivered items were requested for. In addition to information regarding the make-up of the delivered items, the campaign data would also include performance data associated with the content blocks for each of the delivered items. This performance data can specify any type of user interaction data. For example, this can include data regarding whether or not the content block was accessed by a user, the extent of the access by the user, the results of the access, and the time spent by the user in the content block. Other user types of user interaction data not specified above can also be included.

The performance data can also include cost data. For example, this can include the cost of the delivered items to the invitational content provider, such as costs accrued for delivery of specific content blocks and costs accrued responsive to user access of content blocks. The performance data can also include effectiveness data. That is, data regarding the degree of benefit obtained by the invitational content provider or some measure of the effectiveness of the content block, in the eyes of the invitational content provider or some other entity. This data can be compiled by either the content delivery system or the invitational content provider.

Concurrently or following the retrieval of the campaign data at step 404, the method can proceed to step 406 to determine delivered content block sets from the campaign data. Step 406 can involve performing an analysis that identifies the various combinations of content blocks that the delivered items provide. For example, delivered item consisting of content blocks A, B, and C, can be considered to include content block sets AB, AC, BC, and ABC. In the various embodiments, all or a portion of the content block sets defined by the delivered items can be selected for analysis. However, by analyzing a greater number and variety of combinations, a greater understanding can be obtained regarding the interactions between different ones of the content blocks.

Once the various content block sets have been identified at step 406, the method 400 can proceed to step 408 to obtain a ranking with respect to each of the segments. This ranking is based, as noted above, at least on the performance data and a number of content blocks associated with each of the identified content block sets. As further noted above, the ranking is generally based on some type of weighted score function in order to determine weighted scores for each of the content block sets. That, is the score is weighted to essentially normalize scores to account for differences in the number and types of content blocks in invitational content items and the performance obtained from such content items due to their differences. For example, a weighted score function can compute a raw score based solely on the performance data that is adjusted using one or more weights based on the performance data and the number and type of content blocks. Once such weighted scores are computed, they can be used to project what types of content block combinations will be successful for various types of segments.

Although the ranking above is described with respect to specific segments, the present disclosure contemplates that a "segment", for purposes of ranking, can be as specific or as general as required by the invitational content provider. That is, the ranked segments can be the segments utilized by the content delivery system, a combination of these segments, or a subset of any of these segments. Accordingly, the rankings can be customized to provide specific information of interest to the invitation content provider and not merely indicate the performance of content block sets in the segments utilized by the content delivery system. For example, although a segment in the content delivery system can be associated with features A, B, C, and D, the invitational content provider may wish to look at rankings a based on A, B, and C only or even A, B, C, D, and E.

The ranking data can be used for several purposes. First, the ranking data can be used by the invitational content provider to plan or modify a campaign. Second, this ranking data can also be used to handle requests for invitational content, as shown in FIG. 4. In particular, after the ranking is obtained at step 408, the ranking can be used at step 410 to assemble items of invitational content. That is, rather than relying solely on the information in the content bundle, this information can be combined with the ranking information to more intelligently select combination of content blocks for assembling items of invitational content for particular segments. Thereafter, method 400 can proceed to step 412 and resume previous processing, including performing any of the other methods described herein.

For example, as described above, a content bundle will include a library of content blocks and rules for assembling items of invitational content therefrom. In other words, the rules identify a series of allowable combinations of the content blocks for one or more segments. The ranking can then be used to analyze these allowable combinations and determine which should actually be delivered to a user terminal. One possible technique is to perform a comparison of the allowable combinations to the content block sets in the rankings to estimate the position such allowable combinations would likely have in the ranking for a segment. Thereafter, these estimated positions can be used to determine which allowable combinations should be used. For example, in one configuration, only allowable combinations with an estimated position meeting a rank criterion are selected for use. That is, a minimum position with respect to the ranking. In another configuration, only the n-highest ranked allowable combinations would be used for the segment.

In some configurations, the allowable content bundle combinations can also be device class specific. For example, smartphones, tablet devices, and computers (desktop or laptop) can be categorized into different device classes. The ranking can then vary between these device classes and also based on the how the content block was initiated. For example, an interactive banner with a subset of the functions of the invitational content defined by their content bundle, such as an advertising unit, can provide a higher engagement during the banner impression itself versus letting the user click into the advertising unit to experience the full feature set.

Such analyses can also be used to automatically update the rules in the content bundle to reduce the number of allowable combinations for a segment. For example, based on a ranking criteria or n-highest ranked analysis, as described above, the rules can be adjusted to reduce the number of allowed combinations for a segment and thus eliminate the need to repeatedly access the rankings each time an item of invitation content needs to be delivered. In such configurations, the rules can be updated on a scheduled basis, whenever a new ranking is available, or based on any other criteria.

Such analyses can further be used to automatically update the rules in the content bundle to expand the number of allowable combinations for a segment. For example, the estimated positions can be utilized to identify other possible combinations of content blocks that have a higher ranking for a segment. Thus, if any of these combinations are possible for the content block, i.e., supported by the library of content blocks, the rules for the segment can be automatically adjusted to allow such additional combinations and to use these additional combinations for the segment. In such configurations, the rules can also be updated in this manner on a scheduled basis, whenever a new ranking is available, or based on any other criteria.

Aside from the ranking described above, another complexity of a CPF-based campaign is that market forces can affect features in the content bundle and their associated costs. For example, an invitational content provider whose campaign centering around tweets (e.g., an airline during a holiday travel period) may be willing to pay a higher CPF for a specific type of social media integration as compared to another invitational content provider. Thus, there could be market driven pricing to increase costs above the floor minimums initially set for the feature. In a conventional environment, if an invitation content provider wishes to deliver particular invitational content to particular segments of user, a bid process typically allows the invitational content provider to raise costs above the floor minimums. However, a bid process has been found to generally reduce the value of the supply of premium impression and thus revenue for the content delivery system. CPF alleviates this concern. In particular, a CPF-based campaign would result in the invitation content provider and not necessarily the content delivery system determining the price of the ceilings based on their needs and user feedback.

In the various embodiments, the invitational content provider can utilize the rules to control how items of invitational content are assembled in the face of cost fluctuations and thus control costs and performance of the CPF-based campaign. That is, a CPF-based campaign will generally be designed based on certain assumptions regarding costs of the campaign. Specifically, a CPF-based campaign will generally be designed around estimated costs for of each of the content blocks to be included in items of invitational content for the campaign. However, as noted above, these assumptions may not hold over a period of time. For example, as noted above, during specific times of the year, the costs for delivery or user access of particular content blocks may increase. As a result, the cost of items including these content blocks will be increased, possibly reducing the number of items that can be delivered for the invitation content provider.

Figure 5:
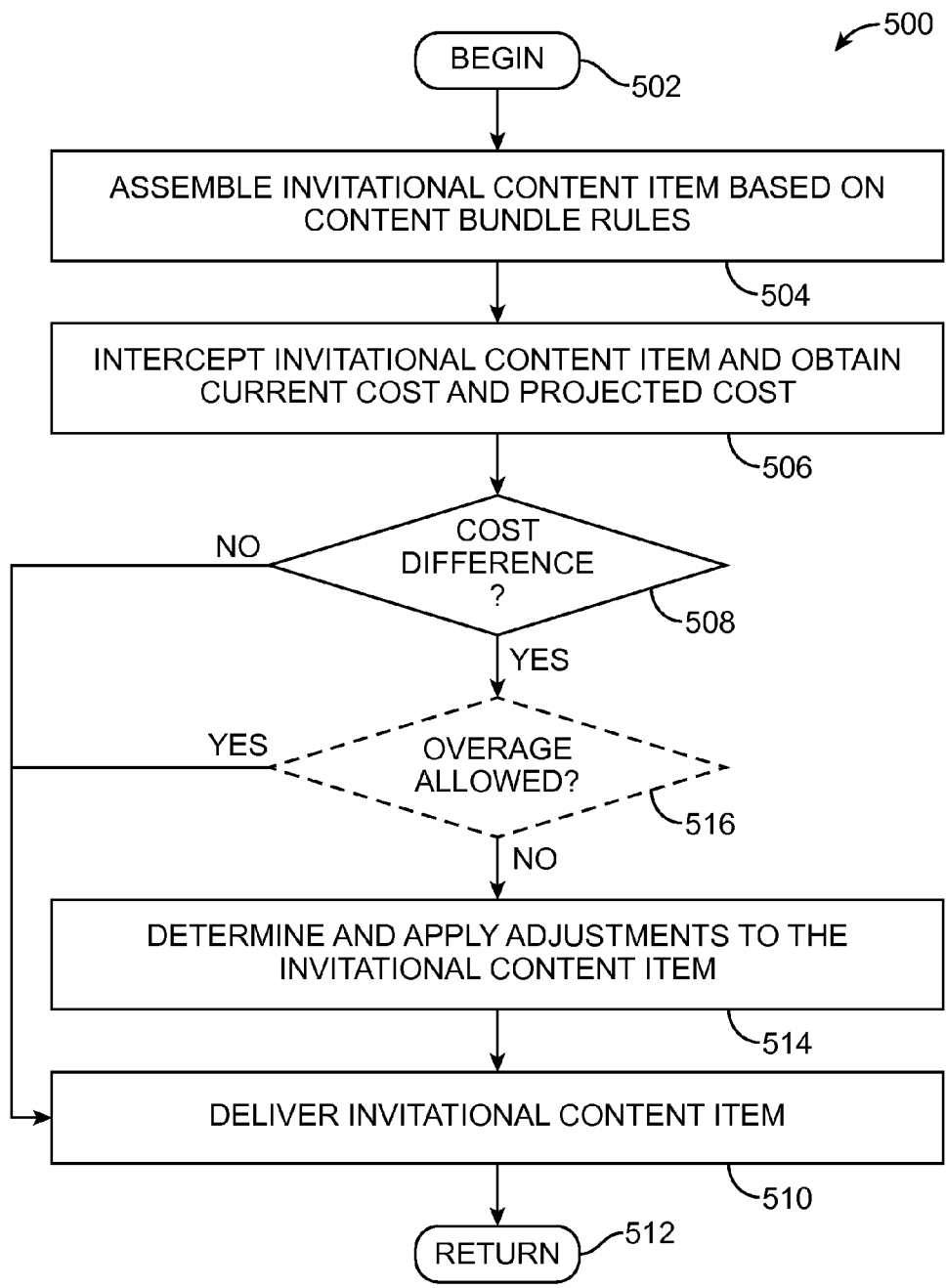
FIG. 5 is a flowchart of steps in an exemplary method 400 for managing a CPF-based campaign based in a dynamic cost environment.

FIG. 5 is a flowchart of steps in an exemplary method 500 for managing a CPF-based campaign based in a dynamic cost environment. The method 500 begins at step 502 and proceeds to step 504. At step 504, the content bundle is configured to assemble an item of invitational content based on the rules in the content bundle.

To provide greater control in such scenarios, the content delivery system and the rules for the content bundle can be configured to adapt to such situations. In particular, the content delivery system can be configured, prior to delivery of an item of invitational content, to analyze the item and determine whether an adjustment of the content blocks is needed prior to delivery. Thus at step 506, the item of invitation content is intercepted and analyzed to determine current cost information and projected cost information. For example, in one configuration, the content delivery system 206 can be configured, via analysis module 215, to determine the current cost for the item and compare the current cost to the cost originally projected by the invitational content provider. The current costs for content blocks can be determined based on a cost or fee schedule maintained by the content delivery system. The projected costs can be included as part of the content bundle or stored separately. If no difference in cost is detected at step 508, the method can proceed to step 510 and deliver the item of invitational content. Thereafter, the method 500 can proceed to step 512 to resume previous processing, including performing any of the methods described herein.

If a difference in cost is detected at step 508, then the content delivery system 206 can take action prior to delivery of the item to user terminals 202. In particular, the method 500 can proceed to step 514 to determine and apply an adjustment for the item of invitational content. Thereafter, the method 500 can proceed to step 510 and deliver the item of invitational content. Finally, the method can proceed to step 512 to resume previous processing, including performing any of the methods described herein.

Turning first to the case of the current cost being greater than a projected cost, the content delivery system can be configured to adjust the item of invitational content to reduce the current cost. For example, the content delivery system 206 can be configured, via analysis module 215, to identify which of the content blocks is contributing to the overage. Thereafter, the content delivery system 206 can remove one or more of these blocks and proceed with delivery. In such cases, a pre-defined ranking of the content blocks can be provided so that less important content blocks are removed first.

Alternatively, the content delivery system 206 can replace one or more of these blocks to reduce costs and proceed with delivery. In such cases, a content blocks can be pre-associated so that a content block is replaced with an equivalent or related content block. As in the previous example, a ranking or priority can be used to identify an order in which to carry out such replacements. As a result of the foregoing techniques, the invitational content providers essentially controls floor pricing for the items of invitation content, as the content blocks can be adjusted as needed to control costs.

In some instances, the invitational content provider can choose to provide for neither removal nor replacement of content blocks. That is, the rules in the content bundle can be configured to specify criteria that would allow an overage in cost. Accordingly, rather than proceeding directly to step 514 from step 508 if a cost difference is detected, method 500 provides for determining first if an overage is allowed at step 516. If an overage is allow, the method proceed to step 510, else the method proceeds to step 514 as previously described.

There are several scenarios in which allowing an overage may be desirable by the invitational content provider. For example, as noted above, the invitational content provider may be willing to spend more during a holiday period since the return on investment is likely to be higher. Thus, the rules can specify any type of date or time criteria during which overages are allowed. In another example, the invitational content provider may be willing to spend more to reach a particular set of users. Thus, the rules can specify, for example, that overages would be allowed for particular types of user terminals or users associated with a particular demographic. In still another example, the degree of the overage can be analyzed and as long as the increase in cost falls below a threshold value, the overage can be allowed. The foregoing combinations are provided solely for illustrative purposes. In the present technology, any other criteria can also be utilized for determining when an overage is allowed.

Another advantage of CPF campaigns is that it can assist in the developing of a practical implementation of a bonusing strategy as an alternate means of controlling overages. In general, bonusing refers to the allowing free impressions, click, or other events that would normally accrue a cost. In CPM and CPC-based campaigns, there are generally very limited options for deriving a good arrangement in terms of bonusing. Bonusing generally comes into play if for some reason there is an under delivery on a contractual campaign line item. Thus, the content delivery system ends up giving away an entire content bundle in a CPC or CPM-based campaign. With CPF, the content delivery system can elect to give away portions of content bundle instead. Thus, with no additional impressions or clicks, the content delivery system can simply elect to not charge for higher engagement for these content bundle combinations. This is a very powerful bonusing method currently not available on CPM and CPC driven networks since it can be used to control costs with respect to the content provider and losses with respect to the content delivery system. Additionally, the content delivery system can also evaluate, over time, the content combinations with the least margins and use them for pro-active bonusing during the lifetime of the campaign to prevent a large overage towards the end of the campaign.

In other instances, the invitational content provider may require that certain content blocks be included, but still require a reduction in cost. In such cases, the content delivery system can first identify such content blocks based on the rules in the content bundle. Thereafter, other ones of content blocks can be replaced or removed, as described above. Alternatively, the rules in the content bundle can be analyzed to determine if there is another allowable combination of content blocks including the required or mandatory content blocks resulting in a reduced cost.

The examples above are generally directed to scenarios related to overages in costs. However, the present technology also contemplates that adjustments can be provided when the current cost falls below the projected cost. That is, content blocks can be replaced or added to provide an item of invitational content with a greater number of features for the originally projected cost. In this configuration, the content bundle can be configured to include rules for "upgrading" content blocks.

In addition to adjusting items of invitational content, the foregoing processes can also be utilized to modify the rules in the content bundle. For example, if a change in a cost is permanent or will persist for an extended period of time, the rules can be adjusted to reflect such changes in cost and thus eliminate the need to repeatedly determine whether a change in cost has occurred. In such configurations, the rules can be updated on a scheduled basis, whenever a new cost schedule is available, or based on any other criteria.

Figure 6:
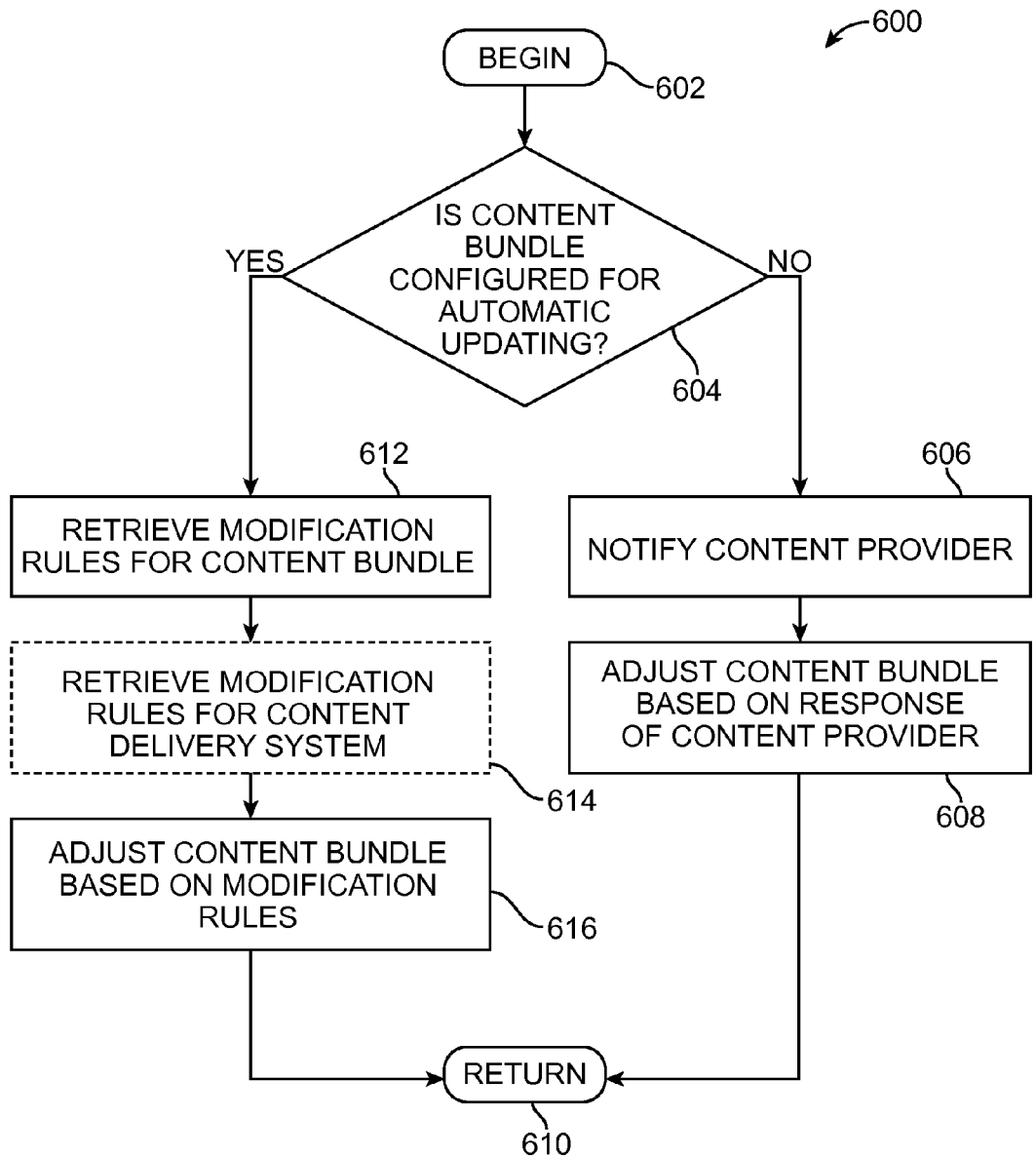
FIG. 6 illustrates an exemplary method embodiment for updating content bundles.

FIG. 6 illustrates an exemplary method embodiment 600 for updating content bundles. For example, method 600 can be used to implement block 316 in method 300. Method 600 begins at block 602 and continues on to block 604. At block 604, it is first determined whether or not the content bundle can be automatically updated. This can be determined in several ways. In some configurations, the content bundle can include a flag or other indicator signaling to the updater system 214 to automatically update the content bundle. For example, the flag or indicator can simply be whether or not modification rules have been specified for the content bundle, for the content delivery system 206, or both. However, the various embodiments are not limited in this regard and a separate flag or indicator can be provided.

If it is determined at block 604 that automatic updating is not available, the method can proceed to block 606 for manual processing. At block 606, a notification can be forwarded to the invitational content provider. The notification can include one or more types of information. For example, the notification can include the analysis data from analysis module 215, one or more recommendations for action, or any other information that might be useful to the invitational content provider for determining how to modify the content bundle. Thereafter, based on the response of the invitational content provider, the content bundle can be adjusted or modified at block 608. The method 600 can then resume previous processing at block 610, including repeating method 600.

Although blocks 606 and 608 are described above as providing manual processing, these blocks are also utilized to enable an automatic updating of the content bundle at locations other than at content delivery system 206. That is, in some configurations, the updater module 214 may not be a part of the content delivery system 206. Instead, the updater module 214 can be under the control of the invitational content provider. In such cases, the notification can include any information needed by the updater module at this location. The response from the invitational content provider can then be delivery or identification of an updated content bundle to the content delivery system 206.

Referring back to block 604, if the content bundle is configured for automatic updating, the method can proceed to block 612. At block 612, the modification rules for the content bundle can be retrieved. In some cases, modification rules specified by the content delivery system can also be retrieved at block 614. Although FIG. 6 illustrates performing block 612 and optionally performing block 614, this is for illustrative purposes only. In some embodiments, instead of block 614 being optional, block 612 can be optional. For example, the present disclosure contemplates circumstances in which a content bundle may not identify any modification rules, but the content delivery system 206 does. Further, in some embodiments, neither of blocks 612 nor 614 are optional.

In the various embodiments, the modification rules can be embodied in different ways. For example, in some configurations, the modification rules can be one or more formulas into which the results of the analysis at analysis module 215 are entered. The results of the formula then indicate how the content bundle is to be adjusted. In other configurations, the modification rules can be a set of thresholds to compare against the results of the analysis. In these configurations, the updater module 214 effects changes in the content bundle when a particular set of criteria is met (or not met). In still other configuration, the analysis can determine patterns of behavior among the various user terminals and the updater module 214 can change the content bundle to provide an assembly of invitational content that best corresponds, with respect to responses, to such patterns. Other configurations are also possible and can be used with the present technology without limitation.

In some cases, the modification rules provided for the content bundle and the content delivery system 206 can be configured to operate cooperatively. For example, the rules from block 614 can provide default rules which are applied unless a corresponding or related rule is provided at block 612. In another example, the rules obtained at block 614 can delineate boundaries for the rules obtained at block 612. That is, content delivery system 206 can be configured to limit or prevent the use of certain types of content blocks. In such cases, the amount of modification allowed by the rules obtained at block 612 is adjusted by the rules obtained at block 614. For example, if the modification rules from block 612 provide for altering the content bundle to include content blocks associated with higher bandwidth versions of a video and the content delivery system 206 is operating on a network 204 upon which such videos would not be supported or in which bandwidth is limited, the rules from block 614 can be used to override the rules from block 612 and prevent the use of such content blocks. Other cooperative arrangements are also possible and can be used with the present technology without limitation.

Once the content bundle is adjusted at block 616, the method 600 can proceed to block 610 and resume previous processing, including repeating method 600.

In some cases, there may be configurations of the content bundle that may be preferred by the content delivery system 206. That is, although the invitational content preferred by the invitational content provider or the current content bundle for a campaign is fully supportable by the content delivery system 206, the content delivery system may wish to limit overall usage of its resources for quality of service reasons, to reserve resources for additional content, to present only certain types of invitational content, or any other reasons. For example, it may be preferable to limit the bandwidth utilized by the content delivery system 206 for one of more portions of the targeted segment in order to meet bandwidth restrictions of a network provider or to ensure quality of service to the targeted segment and any other segments associated with the content delivery system 206. Thus, the content delivery system 206 may prefer that the invitational content for the portions associated with a content bundle be limited to lower bandwidth content. Accordingly, the present disclosure contemplates providing a mechanism for eliciting invitational content providers to accept alternate configurations for content bundles. This is illustrated with respect to FIG. 7.

Figure 7:
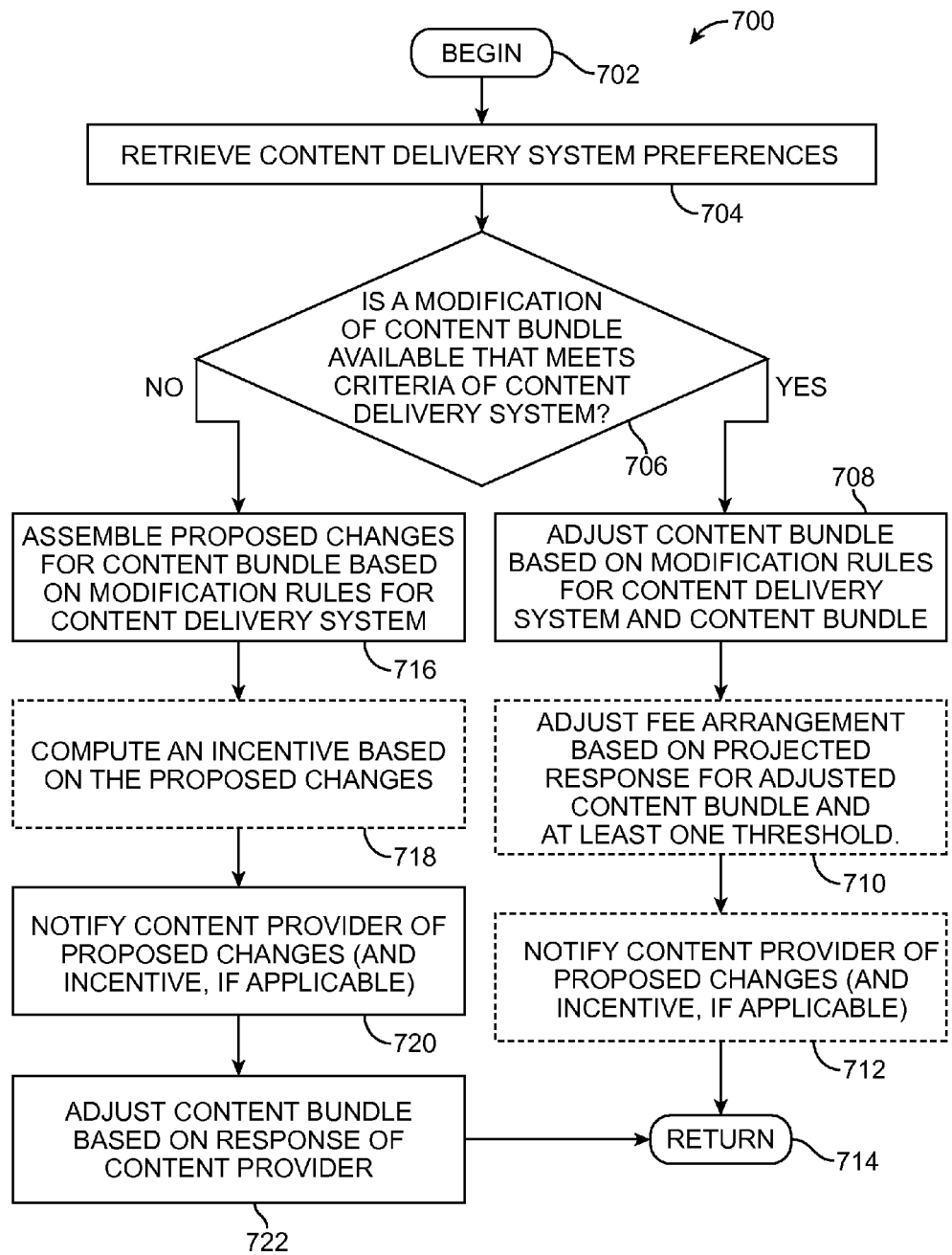
FIG. 7 illustrates an exemplary method embodiment for assembling changes for the updating of content bundles.

FIG. 7 illustrates an exemplary method embodiment 700 for assembling changes for the updating of content bundles when automatic updating of the content bundle is available. That is, at least some modification rules are in place at either the content delivery system or are specified by the content bundle, as previously described with respect to FIG. 6. Method 700 begins at block 702 and continues on to block 704. At block 704, the preferences of the content delivery system are obtained. As noted above, these can include preferences with respect to resources required for the invitational content, preferences with respect to the content within the invitational content, or any other preferences for the content delivery system with respect to invitational content.

Once the preferences are obtained at block 704, the method 700 can determine at block 706 whether or not a modification of the content bundle is possible in view of the preferences of the content delivery system 206. That is, whether any modification rules in place would allow the content bundle to be adjusted in accordance with the preferences. If such a modification is possible in view of the existing modification rules, the method proceeds to block 708 to automatically adjust the content bundle.

The present disclosure contemplates that such modification could result in a sub-optimal level of response for the invitational content being generated by the adjusted content bundle. Accordingly, in some embodiments the content delivery system 206 can be configured to compensate the invitational content provider. In particular, a financial incentive can be applied in view of the change at block 710. In some cases, the incentive can be pre-defined. In other cases, the incentive can be computed. For example, the incentive can be based on a projection of the performance of the adjusted content bundle. Other methods of computing the incentive can also be used without limitation.

Optionally, a notification of the changes can be forwarded to the invitational content provider at block 712. Thereafter, the method 700 can resume previous processing at block 714, including repeating method 700.

Referring back to block 706, if a modification is not possible, further input from the invitational content provider may be needed. First, at block 716, a proposed set of changes for the content bundle can be assembled. For example, the proposed content bundle can be generated based on the preferences of the content delivery system. Optionally, at block 718, a proposed incentive for the proposed content bundle can be computed. Thereafter, the proposed set of changes (and incentive, if any) can be forwarded to the invitational content provider at block 720. Finally, based on the response received from the invitational content provider at block 720, the content bundle can be adjusted at block 722. Method 700 can then resume previous processing at block 714, including repeating method 700.

The present disclosure contemplates that block 722 can include a negotiation between the content delivery system 206 and the invitational content provider. This can involve repeating blocks 716-720 for various configurations until a positive response is received at block 720.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method, comprising:
   identifying a content bundle comprising a plurality of content blocks and rules for selectively combining a portion of the plurality of content blocks into modular invitational content items;
   receiving campaign data comprising information identifying a plurality of delivered items assembled using the content bundle, the portion of the plurality of content blocks associated with each of the plurality of delivered items, a plurality of segments associated with each of the plurality of delivered items, and performance data for the content blocks in each of the plurality of delivered items;
   identifying a plurality of content block sets provided by the plurality of delivered items;
   for each of the plurality of segments, obtaining a ranking of the plurality of content block sets based at least on the performance data and a number of content blocks associated with each of the plurality of content block sets; and
   assembling an item of invitational content for at least one of the plurality of segments based on the content bundle and the ranking of the plurality of content block sets.

2. The method of claim 1, wherein the obtaining comprises:
   evaluating a weighted score function to determine weighted scores for each of the plurality of content block sets, wherein the weighted score function is inversely related to the number of content blocks and directly related to the performance data; and
   ranking the plurality of content block sets based on the weighted scores.

3. The method of claim 2, wherein the performance data comprises cost data and user response data, wherein the weighted score function is dependent on a plurality of weights, and wherein each of the plurality of weights corresponds to one of the number of content blocks, the cost data, and the user response data.

4. The method of claim 1, further comprising:
   receiving a request to assemble an item of invitational content for a specified segment; and
   responsive to the request, accessing the content bundle identifying a library of content blocks and rules for combining content blocks from the library to assemble items of invitation content and assembling the item of invitational content for the specified segment based at least on the content bundle and the ranking.

5. The method of claim 1, further comprising:
   accessing the content bundle to assemble a plurality of potential items of invitational content for at least one of the plurality of segments, based at least on the rules for the content bundle;
   determining estimated positions for the plurality of potential items in the ranking associated with the at least one of the plurality of segments, the estimated positions based on a comparison of the plurality of potential items to the plurality of content block sets; and
   modifying the rules for the content bundle based on the estimated positions.

6. The method of claim 5, wherein modifying the rules further comprises adjusting the rules to assemble a portion of the plurality of potential items associated with highest ones of the estimated positions responsive a request associated with the at least one of the plurality of segments.

7. The method of claim 5, wherein modifying the rules further comprises:
   identifying a portion of the plurality of content block sets having positions higher that the estimated positions of the plurality of potential items to yield identified content block sets;
   determining a portion of the identified content block sets that can be assembled from the plurality of content blocks to yield new content block sets; and
   adjusting the rules to assemble items of invitational content using the new content block sets responsive a request associated with the at least one of the plurality of segments.

8. A system, comprising:
   a content bundle database for storing a content bundle identifying at least a plurality of content blocks and rules for selectively combining a portion of the plurality of content blocks to assemble one or more items of invitational content for a user terminal based at least on preferences and properties associated with the user terminal;
   a content management module for generating and delivering, based on the content bundle, the items of invitational content to user terminals to yield a plurality of delivered items of invitational content; and
   an analysis module for receiving campaign data comprising information identifying the plurality of delivered items, content blocks and a plurality of segments associated with the plurality of delivered items, and content blocks in the plurality of delivered items, identifying a plurality of content block sets associated with each of the plurality of delivered items, and obtaining a ranking of the plurality of content block sets for each of the plurality of segments based at least on the performance data and a number of content blocks associated with each of the plurality of content block sets.

9. The system of claim 8, wherein the analysis module obtains the ranking by evaluating a weighted score function to determine weighted scores for each of the plurality of content block sets and ranking the plurality of content block sets based on the weighted scores, wherein the weighted score function is inversely related to the number of content blocks and directly related to the performance data.

10. The system of claim 9, wherein the performance data comprises cost data and user response data, wherein the weighted score function is dependent on a plurality of weights corresponding to the number of content blocks, the cost data, and the user response data.

11. The system of claim 8, wherein the content management module is further configured for receiving a request to assemble an item of invitational content for a specified segment, accessing a content bundle identifying a library of content blocks and rules for combining the content blocks from the library into items of invitational content, and assembling the item of invitational content for the specified segment based at least on the content bundle and the ranking.

12. The system of claim 8, further comprising an updater module for accessing a content bundle identifying a library of content blocks and rules for combining content blocks from the library to assemble items of invitation content, assembling a plurality of potential items of invitational content for at least one of the plurality of segments based on the content bundle, determining estimated positions for the plurality of potential items in the ranking associated with the at least one of the plurality of segments, modifying the rules for the content bundle based on the estimated positions, wherein the estimated positions are based on a comparison of the plurality of potential items to the plurality of content block sets.

13. The system of claim 12, wherein the updater module modifies the rules by adjusting the rules to assemble a portion of the plurality of potential items associated with highest ones of the estimated positions responsive a request associated with the at least one of the plurality of segments.

14. The system of claim 12, wherein the updater module modifies the rules by identifying a portion of the plurality of content block sets that having positions higher that the estimated positions of plurality of potential items and to yield identified content block sets, determining a portion of the identified content block sets that can be assembled from the library of content blocks to yield new content block sets, and adjusting the rules to assemble items of invitation content using the new content block sets responsive a request associated with the at least one of the plurality of segments.

15. A non-transitory computer-readable medium comprising instructions for:
  receiving a content bundle identifying at least a plurality of content blocks, cost estimate information for the plurality of content blocks, and rules for combining the plurality of content blocks to assemble one or more items of invitational content for a user terminal based at least on preferences and properties associated with the user terminal;
  identifying, based on the content bundle, selected blocks from the plurality of content blocks to assemble a candidate item of invitational content to deliver to a target user terminal;
  comparing a current cost for the candidate item to a projected cost for the candidate item based on the cost estimate information;
  processing the candidate item to apply at least one adjustment that alters the current cost to yield a modified candidate item; and
  subsequent to the processing, delivering the modified candidate item to the target user terminal.

16. The non-transitory computer-readable medium of claim 15, wherein the processing comprises:
  identifying a portion of the selected blocks associated with the current cost exceeding the projected cost to yield identified blocks; and
  selecting the at least one adjustment to be a removal of at least one of the identified blocks from the candidate item.

17. The non-transitory computer-readable medium of claim 15, wherein the processing comprises:
  identifying a portion of the selected blocks associated with the current cost exceeding the projected cost to yield identified blocks;
  selecting the at least one adjustment to be a replacement of at least one of the identified blocks with an alternate one of the plurality of content blocks, wherein the alternative one of the plurality of content blocks is selected based on the rules.

18. The non-transitory computer-readable medium of claim 15, wherein the processing comprises:
  identifying a portion of the selected blocks associated with the current cost exceeding the projected cost to yield identified blocks;
  based on the rules, determining whether a pre-defined criterion for exceeding the projected cost has been met; and
  if the pre-defined criterion has not been met, selecting the at least one adjustment to be a removal of at least one of the identified blocks from the candidate item.

19. The non-transitory computer-readable medium of claim 18, wherein the pre-defined criterion specifies at least one of a time, a date, or a type of user terminal.

20. The non-transitory computer-readable medium of claim 15, wherein the processing comprises:
  identifying a portion of the selected blocks that are mandatory based on the rules; and
  identifying an alternate candidate item of invitational content comprising the portion of the selected blocks and selecting the adjustment to be a replacement of the candidate item with the alternate candidate item.

21. A content delivery system comprising:
  a content bundle database for storing a content bundle identifying at least a plurality of content blocks, cost estimate information for the plurality of content blocks, and rules for combining the plurality of content blocks to assemble one or more items of invitational content for a user terminal based at least on preferences and properties associated with the user terminal;
  a content management module for assembling, based on the content bundle, a candidate item of invitational content for a target user terminal by identifying selected blocks from the plurality of content blocks;
  an analysis module for comparing a current cost for the candidate item to a projected cost for the candidate item based on the cost estimate information and processing the candidate item to apply at least one adjustment based at least on the comparing, and, subsequent to the processing, causing the content management module to deliver the candidate item to the target user terminal.

22. The system of claim 21, wherein the processing by the analysis module further comprises:
  determining whether the current cost exceeds the projected cost, and
  based on the determining, identifying a portion of the selected blocks associated with a difference between the current cost and the projected cost to yield identified blocks and selecting the at least one adjustment to be a removal of at least one of the identified blocks from the candidate item.

23. The system of claim 21, wherein the processing by the analysis module further comprises:
  determining whether the current cost exceeds the projected cost, and
  based on the determining, identifying a portion of the selected blocks associated with a difference between the current cost and the projected cost to yield identified blocks and selecting the at least one adjustment to be a replacement of at least one of the identified blocks with an alternate one of the plurality of content blocks, wherein the alternative one of the plurality of content blocks is selected based on the rules.

24. The system of claim 21, wherein the processing by the analysis module further comprises:
  determining whether the current cost exceeds the projected cost, and
  based on the determining, identifying a portion of the selected blocks associated with a difference between the current cost and the projected cost to yield identified blocks, ascertaining whether a pre-defined criterion for exceeding the projected cost has been met, and selecting the at least one adjustment to be a removal of at least one of the identified blocks from the candidate item if the pre-defined criterion has not been met.

25. The system of claim 24, wherein the pre-defined criterion specifies at least one of a time, a date, or a type of user terminal.

26. The system of claim 21, wherein the processing by the analysis module further comprises:
- identifying a portion of the selected blocks that are mandatory based on the rules; and
- if the current cost exceeds the projected cost, identifying an alternate candidate item of invitational content comprising the portion of the selected blocks and selecting the adjustment to be a replacement of the candidate item with the alternate candidate item.

* * * * *